US010016840B2

(12) United States Patent
Atin et al.

(10) Patent No.: US 10,016,840 B2
(45) Date of Patent: Jul. 10, 2018

(54) FABRICATION OF PIPE STRINGS USING FRICTION STIR WELDING (71) Applicant: Acergy France SAS, Suresnes (FR)

(72) Inventors: Cesar Atin, Nanterre (FR); Jacques Lacome, Sucy en Brie (FR); Gregory Alexandre Toguyeni, La Garenne-Colombes (FR)

(73) Assignee: Acergy France SAS, Suresnes (FR)

( * ) Notice: Subject to any disclaimer, the term of this patent is extended or adjusted under 35 U.S.C. 154(b) by 56 days.

(21) Appl. No.: 15/310,777

(22) PCT Filed: May 13, 2015

(86) PCT No.: PCT/IB2015/000958
§ 371 (c)(1),
(2) Date: Nov. 13, 2016

(87) PCT Pub. No.: WO2015/173640
PCT Pub. Date: Nov. 19, 2015

(65) Prior Publication Data
US 2017/0080519 A1 Mar. 23, 2017

(30) Foreign Application Priority Data
May 14, 2014 (GB) .................... 1408580.7

(51) Int. Cl.
B23K 20/12 (2006.01)
B23K 37/02 (2006.01)
(Continued)

(52) U.S. Cl.
CPC .......... *B23K 20/129* (2013.01); *B23K 20/123* (2013.01); *B23K 20/126* (2013.01);
(Continued)

(58) Field of Classification Search
CPC ............ B23K 37/0276; B23K 37/0533; B23K 37/0282; B23K 37/0435; B23K 37/0531;
(Continued)

(56) References Cited

U.S. PATENT DOCUMENTS 4,767,048 A 8/1988 Kimbrough et al.
5,697,544 A * 12/1997 Wykes ................. B23K 20/125
156/580

(Continued)

FOREIGN PATENT DOCUMENTS

EP 0 615 480 6/1993
EP 0 893 189 1/1999
(Continued)

Primary Examiner — Kiley Stoner
(74) Attorney, Agent, or Firm — Levy & Grandinetti (57) ABSTRACT A method of fabricating a metal pipeline by friction stir welding (FSW) along a circumferential interface includes spinning first and second FSW tools about respective axes of rotation in contact with a pipe wall to heat, plasticize, and stir respective zones of plasticized metal at the interface. The zone of plasticized metal produced by the second FSW tool extends deeper into the pipe wall than the zone of plasticized metal produced by the first FSW tool. Relative circumferential movement of the FSW tools along the interface is controlled such that the second FSW tool following the first FSW tool enters the zone of plasticized metal produced by the first FSW tool while the metal in that zone remains plastic.

22 Claims, 7 Drawing Sheets (51) Int. Cl.
  *B23K 37/053* (2006.01)
  *B23K 101/10* (2006.01)

(52) U.S. Cl.
  CPC ...... *B23K 20/1235* (2013.01); *B23K 20/1255* (2013.01); *B23K 37/0276* (2013.01); *B23K 37/0531* (2013.01); *B23K 2201/10* (2013.01)

(58) Field of Classification Search
  CPC .... B23K 20/26; B23K 20/1245; B23K 20/22; B23K 20/126; B23K 2201/34; B23K 2201/10; B23K 20/122–20/129; E21B 17/04; E21B 19/16
  USPC ................................................ 228/2.1, 112.1
  See application file for complete search history.

(56) References Cited

U.S. PATENT DOCUMENTS

| | | | |
|---|---|---|---|
| 6,419,142 | B1 | 7/2002 | Larsson |
| 7,270,257 | B2 | 9/2007 | Steel et al. |
| 2002/0158109 | A1* | 10/2002 | Gendoh ............... B23K 20/123 228/112.1 |
| 2006/0260376 | A1* | 11/2006 | Osame ............... B21C 23/085 72/269 |
| 2008/0274383 | A1* | 11/2008 | Kanno ............... B23K 20/123 429/412 |
| 2010/0159265 | A1 | 6/2010 | Fairchild et al. |
| 2011/0127311 | A1 | 6/2011 | Peterson et al. |
| 2012/0298727 | A1* | 11/2012 | Stol ............... B23K 20/1245 228/112.1 |
| 2014/0034710 | A1 | 2/2014 | Nelson et al. |
| 2014/0069984 | A1 | 3/2014 | Mialhe et al. |
| 2014/0069987 | A1 | 3/2014 | Mialhe et al. |
| 2014/0217154 | A1* | 8/2014 | Obaditch ............. B23K 20/126 228/112.1 |
| 2016/0167161 | A1* | 6/2016 | Sato ............... B23K 20/1255 228/114.5 |
| 2017/0050263 | A1* | 2/2017 | Wu ............... B23K 20/1245 |
| 2017/0157720 | A1* | 6/2017 | Sato ............... B23P 6/04 |
| 2018/0021881 | A1* | 1/2018 | Weigl ............... B23K 20/123 |

FOREIGN PATENT DOCUMENTS

| | | | |
|---|---|---|---|
| EP | 2 018 241 | 1/2009 | |
| JP | 2004017128 | 1/2004 | |
| JP | 2017113792 A | * 6/2017 | ......... B23K 20/1265 |
| WO | WO 95/26254 | 10/1995 | |
| WO | WO 2010/074755 | 7/2010 | |
| WO | WO 2014/120241 | 8/2014 | |

\* cited by examiner

FIG. 1

PRIOR ART

FIG. 2

PRIOR ART

FIG. 3

PRIOR ART

FABRICATION OF PIPE STRINGS USING FRICTION STIR WELDING

This invention relates to the use of friction stir welding (FSW) when fabricating pipe strings for use in pipelines. Such pipelines may be for subsea use, as especially required in the offshore oil and gas industry.

FSW is a joining process performed between facing surfaces of abutting clamped metal parts. The process may be performed at a butt joint or at an overlapping joint between the parts, although a butt joint is more relevant to pipeline fabrication. A specially-profiled probe, pin or tip protruding from the end of a rapidly-rotating tool is driven into and then traversed along the joint. The tool spins about an axis that is substantially perpendicular to the surface of the metal into which the probe is driven.

Friction between the rotating probe and the stationary parts generates heat and material viscosity such that the metal of the parts softens but does not melt. Whilst FSW is regarded as a substantially solid-state process, the metal of the abutting parts adjacent to the probe undergoes a temporary transformation into a plasticised state. When in that plasticised state, the metal experiences highly dynamic fluid flow driven by the spin of the probe.

Specifically, the rapid stirring action of the rotating probe intermixes the softened metal of the two parts along the region of their abutting interface. This intense deformation adds further heat to the metal. Simultaneously, mechanical forging pressure is applied by a shoulder of the tool around the probe to consolidate the weld region. The forging pressure exerted by the tool is resisted by a weld backing member that is positioned in opposition to the tool about the weld.

As the tool advances, plasticised metal is forced behind the probe and is left behind as the probe traverses further along the joint. Then, clamping force between the parts promotes consolidation of the weld before the plasticised metal cools and hardens.

A characteristic of FSW is that no filler metal is added between the parts. Also, the probe is a non-consumable item although it is, of course, subject to wear and replacement in extended use.

Upon metallurgical analysis, the following principal zones are evident in the cooled and hardened weld following FSW:
  a thermo-mechanically affected zone (TMAZ) that follows the path of the probe during welding, being the region that has been affected metallurgically by both temperature cycling and plastic deformation; and
  as in all welding processes, a heat-affected zone (HAZ) comprising base metal beside the welded joint that has been affected metallurgically by temperature cycling. The HAZ encompasses, and extends beyond, each side of the TMAZ; however, the portion of the HAZ outside the TMAZ has not deformed plastically during welding.

Together, the TMAZ and HAZ define a dynamic recrystallised zone, known in the art as the DXZ.

The TMAZ is slightly wider than the width of the probe and extends slightly deeper into the metal than the depth or length of the probe. The TMAZ may itself be divided to include a stir zone, being the central region of the most heavily-deformed material that most closely follows the path and width of the probe.

Following its invention, FSW gained acceptance quickly for use on metals with a low softening temperature such as aluminium alloys. Inexpensive tools made of hardened tool steels provide sufficient hardness and abrasion resistance for use with such metals. FSW has been used with such metals in the aerospace, marine and transportation industries for several years. However, it is only recently that tool materials and geometries have been devised to perform FSW on metals with a high softening temperature, such as steels.

Performing FSW on ferrous alloys such as steels—and indeed on many nonferrous alloys—requires a tool and especially a probe with the thermal stability to withstand temperatures of around 900 to 1200 Celsius. Achieving consistent welds at such high temperatures while achieving sufficient wear-resistance and mechanical strength under high loads places extraordinary demands on the tool.

The main mechanical forces that act on a rotating tool during FSW are as follows:
  a z-axis force toward the abutting metal parts, which is necessary to plunge the probe into the metal and to maintain the probe at an appropriate depth below the surface of the metal;
  an x-axis traverse force acting in a tool traverse direction aligned with the direction of tool motion along the joint, arising from resistance of the softened metal to that motion of the tool; and
  torque required to rotate the tool, which will depend on the z-axis force, friction between the probe and the metal of the parts being joined and the resistance of that metal, when softened, to flow around the probe when stirred by the probe.

An example of a tool for performing FSW on metals with a high softening temperature is offered by MegaStir Technologies LLC of Utah, USA. The tool comprises a shank of tungsten carbide that is held in a liquid-cooled tool holder to manage heat removal. A locking collar attaches a replaceable probe of polycrystalline cubic boron nitride to the shank so as to transmit torque from the shank to the probe during FSW.

FSW machines typically employ a thermocouple facing the probe to feed a temperature signal to a controller in use. The controller provides continuous, real-time temperature control, modifying tool rotation speed, tool traverse speed and optionally also z-axis load as may be required to remain within a window of workpiece temperature and tool loads that is necessary to maintain steady-state FSW conditions. It is also important to prevent tool failure and to minimise wear and fatigue to the tool and the machinery that supports and drives the tool. As conditions that favour low tool loads may not favour high productivity and good weld properties, a suitable compromise may have to be reached.

Shielding gas is not necessarily required for FSW but, optionally, a gas shroud may be positioned around the tool to provide a flow of inert gas such as argon or carbon dioxide, if such gas is needed as a barrier to oxidation of the metal being welded during FSW.

Background examples of FSW are described in EP 0615480, WO 95/26254 and EP 2018241. US 2014/034710 to Brigham Young University and MegaStir Technologies LLC provides a brief overview of the art of FSW and describes the ongoing challenges of extending FSW to metals with a high softening temperature. JP 2004017128 describes FSW apparatus having two weld heads, in which the weld heads are configured to move in opposite directions along the join line to balance forces exerted on the welded parts. US 2014/069987 describes a method of joining two sheet components of an aircraft wing using FSW, in which a plurality of FSW heads are used to provide a wider weld than could otherwise be achieved with a single weld head. Specifically, two weld heads are moved side-by-side along the weld line. A third, shorter, weld head follows behind the two leading weld heads to smooth over the join between the weld lines that the two leading weld heads create.

It is attractive to seek wider application for FSW because, in principle, the process is capable of producing a consistent, high-strength joint in a single welding pass while minimising post-process operations. FSW is safe, clean and promises exceptional repeatability. Particular advantages of FSW over traditional fusion-welding methods arise from avoiding problems associated with cooling from the liquid phase, notably redistribution of solutes, porosity and solidification cracking.

The present invention is particularly concerned with the problems that must be overcome if FSW is to be applied to the welding of thick-walled steel pipes for deep-water use, whose wall thickness may, for example, be from 20 mm to 80 mm, and is usually between 25 mm and 50 mm. Such pipes may be used as flowlines or tie-ins on the seabed or as catenary risers extending upwardly from the seabed to a surface installation or to a riser support buoy that is tethered beneath the surface. Some such pipes are lined with a corrosion-resistant alloy (CRA); CRA-lined steel pipes may also be welded in accordance with the invention, optionally including an additional internal welding operation that is performed on the CRA liner.

Marine pipelaying techniques involving fabrication of a rigid pipeline on a vessel are generally categorised as either S-lay or J-lay, although variants and hybrids of those techniques have been proposed and used, such as 'steep S-lay'. J-lay operations will be used to exemplify the invention in the description that follows, as the invention has particular benefits in that context. However, the invention may have benefit in any operation in which pipe lengths are girth-welded end-to-end for subsea use, such as in S-lay operations, when fabricating pipes at a spoolbase for reel-lay operations, or when fabricating offshore tie-ins.

The invention is applicable to the following welding positions, which are determined by the pipe orientation and whether the pipe is fixed or turning about its longitudinal axis during welding:
  for S-lay operations and for welding at spoolbases, with the pipe on a horizontal axis—the '5G' position if the pipe is fixed or the '1G' position if the pipe is turning;
  for J-lay operations, with the pipe fixed on a vertical axis—the '2G' position; and
  for fabrication of offshore tie-ins, with the pipe fixed on an inclined axis between vertical and horizontal—the '6G' position.

'1G', '2G', '5G' and '6G' are globally-recognised expressions for those welding positions, as used by the American Welding Society (AWS).

Where the pipe is fixed, the invention contemplates FSW machines that orbit the pipe circumferentially along the butt joint. Where the pipe turns instead, an FSW machine may simply remain fixed beside the pipe in alignment with the butt joint. In either case, FSW can be performed irrespective of the orientation of the parts being joined because no liquid weld pool is formed. This is another reason why FSW is attractive to the subsea oil and gas industry.

In all cases involving fabrication on a vessel, the speed of pipelaying depends upon minimising the timescale of operations on the critical path. It is particularly important that welding, weld testing and field joint coating take no longer than is necessary. Any delays on the critical path can be hugely expensive as they tie up marine assets that cost hundreds of thousands of US dollars per day to operate. Delays may even risk abandonment of the pipelaying operation if sea conditions deteriorate before the pipeline is fully installed.

High-quality welds must be achieved consistently and as quickly as possible. In this respect, weld quality cannot be sacrificed for speed: a pipe string cannot be launched if it has any critical weld defects. Thus, the completed weld is examined by radiography and/or by ultrasound techniques. Only after passing inspection can the weld be coated with a field joint coating and then launched into the sea as part of the pipe string.

Any unacceptable defect found upon inspection of a weld must be rectified either by repairing the defect or by cutting out the welded region and repeating the entire welding operation. Rectification of a defective weld takes such a long time that it inevitably impacts upon the critical path of pipelaying. So, everything possible must be done to prevent critical weld defects arising in the first instance.

Girth welds between pipe joints have traditionally been made by arc-welding processes, typically gas tungsten arc welding (GTAW) or gas metal arc welding (GMAW). GTAW and GMAW are practically difficult in marine yard or offshore conditions because a protective shelter with air and gas management systems has to be built around the joints during welding. This applies especially during welding of any internal CRA layer, which is exceptionally sensitive to gas composition.

Before welding, the ends of opposed pipe lengths must be bevelled or re-bevelled if necessary and thoroughly cleaned and dressed. The pipe lengths are then pulled together and aligned with an internal line-up clamp. The pipe lengths must be aligned accurately to ensure that the internal profile is as even as possible. The weld root gap between the bevels must also be set precisely.

In traditional welding methods, an external bevel defines an external groove between abutting lengths of pipe; optionally, an internal bevel defines an internal groove in alignment with the external groove. Welding is performed from the external side and optionally also from the internal side using a filler wire to lay a root bead and then to fill the grooves with one or more further welding passes. As multiple welding passes are required and as the weld region must be cleaned to bare metal between each pass to remove slag, this all takes a considerable length of time.

Recent developments in the FSW art have led to proposals to use FSW for butt-welding of pipe joints. For example, WO 2010/074755 proposes butt welding of single-wall unlined pipes involving an FSW step. First, a root pass weld is performed inside a pipe by fusion welding to create a solid 'backing' root bead. Subsequently, FSW is used on the external side to complete the weld.

WO 2010/074755 proposes applying a root weld so as to avoid the complication of applying an internal backing member to the root area to support the joint during the subsequent FSW step. However, WO 2010/074755 acknowledges that this approach requires particularly careful design of the root weld geometry as there is a risk that the very large z-axis load applied through the FSW tool in use could cause the root area to collapse inwardly—namely, 'dropout'.

U.S. Pat. No. 7,270,257 teaches an FSW solution for welding pipes. It employs external clamps to hold the ends of abutting pipe lengths, which clamps are mounted on the same movable support arm as an FSW tool. A backing mandrel within the pipe can be expanded radially in various ways, such as by inflation.

The aforementioned MegaStir Technologies LLC is offering orbital FSW machines that are said to be capable of welding pipe whose outer diameter is from 12 inches to 60 inches (about 305 mm to about 1520 mm). However, the wall thicknesses of some subsea pipes exceed the capability of known FSW tools. The difficulty is that probes of known FSW tools can penetrate to a depth of little more than 20 mm. Consequently, if such tools were used on a pipe whose wall thickness appreciably exceeds 20 mm, the result would be a defective weld that does not extend through the full thickness of the pipe wall.

More specifically, the probe of an FSW tool can only penetrate to a depth that is permitted by the extent of the plasticised region surrounding the probe, corresponding to the TMAZ. Lengthening the probe would not, in itself, solve this problem: it would risk failure of the tool, increase friction and necessitate the application of greater force to spin and to traverse the tool. Penetrating deeper with a longer probe would require the welding tool to spin faster and hence would consume more power. The additional heat thus generated would damage the tool, even if key parts of the tool are made of ceramics in accordance with the state of the art. Excessive heat may also degrade the pipe being welded, remembering that FSW aims merely to soften the metal of the pipe and not to heat that metal into the liquid phase.

It is well known to preheat a pipe to support a subsequent welding operation that is performed while the pipe is still hot. However, keeping the pipe warm enough before the welding operation may be a problem, without risking overheating of the pipe at the outset. There is also a risk of promoting unwanted changes in the structure of the steel, such as a phase change or the creation of brittle zones in the HAZ if the temperature rises too high.

It is against this background that the present invention has been devised.

In one sense, the invention resides in a method of fabricating a metal pipeline by friction stir welding (FSW) along a circumferential interface between lengths of pipe disposed end-to-end or between a length of pipe and a pipeline accessory. The method of the invention comprises: spinning first and second FSW tools about respective axes of rotation in contact with a pipe wall to heat, plasticise and stir respective zones of plasticised metal at the interface, the zone of plasticised metal produced by the second FSW tool extending deeper into the pipe wall than the zone of plasticised metal produced by the first FSW tool; and effecting relative circumferential movement of the FSW tools along the interface such that the second FSW tool follows the first FSW tool in a traverse direction and enters the zone of plasticised metal produced by the first FSW tool while the metal in that zone remains plastic.

In general, the first and second FSW tools may be two of a group of three or more such tools, each of the tools in that group spinning about respective axes of rotation. The zone of plasticised metal produced by a trailing tool of an adjacent pair of tools in the group may extend deeper into the pipe wall than the zone of plasticised metal produced by a leading tool of that pair, with respect to the direction of relative circumferential movement of the tools along the interface.

Preferably, the first and second FSW tools are outside the pipe and are forced radially inwardly along their axes of rotation against an external surface of the pipe; and an internal back-up member is positioned against an internal surface of the pipe in opposition to the inward forces applied by the first and second FSW tools. For example, the internal back-up member may be applied to the internal surface of the pipe by radially-outward movement of that member from an internal line-up clamp that is positioned to bridge the interface.

To accelerate and facilitate FSW operations, heat is preferably added to a leading portion of the pipe wall before, during or after heating, plasticising and stirring that portion of the pipe wall with the first FSW tool. For example, the leading portion of the pipe wall may be heated by locally heating at least part of an internal back-up member within the pipe. Alternatively, the leading portion of the pipe wall may be heated by induction heating or by electrical resistance heating. In that latter case, the method of the invention suitably comprises advancing an induction heating system or an electrical resistance heating system with the FSW tools around the interface.

Conversely, a trailing portion of the pipe wall may be cooled after that portion of the pipe wall has been heated, plasticised and stirred by the second FSW tool or any following FSW tool. For example, the trailing portion of the pipe wall may be cooled by locally cooling at least part of an internal back-up member within the pipe.

The inventive concept also embraces apparatus for fabricating a metal pipeline by friction stir welding (FSW) along a circumferential weld interface, wherein: the apparatus comprises a carriage that is arranged for movement parallel to the weld interface and that supports first and second FSW tools both to follow the weld interface upon movement of the carriage; the apparatus comprises a controller configured to drive the FSW tools to spin about respective circumferentially-spaced axes of rotation so as to heat, plasticise and stir respective zones of plasticised metal when probes of those FSW tools are in contact with a pipe wall at the weld interface and configured to move the carriage along the weld interface such that the second FSW tool trails the first FSW tool along the interface as the FSW tools are driven to spin about their respective axes of rotation; and the first FSW tool has a shorter probe length to produce a relatively shallow zone of plasticised metal and the second FSW tool has a longer probe length to produce a relatively deep zone of plasticised metal that extends deeper into the pipe wall than the zone of plasticised metal produced by the first FSW tool.

The controller may suitably be configured to control movement of the carriage along the weld interface such that the second FSW tool following the first FSW tool enters the zone of plasticised metal produced by the first FSW tool while the metal in that zone remains plastic.

The axes of rotation of the first and second FSW tools suitably extend radially from an axis corresponding, in use, to a central longitudinal axis of the pipe. In that case, shoulders around the probes of the first and second FSW tools are preferably at substantially a common radial distance from the axis that corresponds, in use, to the central longitudinal axis of the pipe.

The carriage may be mounted movably to the pipe. Alternatively, the carriage may be mounted to an external support attached to a foundation.

An induction pre-heating system or an electrical resistance pre-heating system is conveniently mounted on the carriage or otherwise movable with the carriage along the weld interface.

The apparatus of the invention preferably further comprises an internal line-up clamp that can be positioned to bridge the interface, the clamp carrying an internal back-up member that may be applied to the internal surface of the pipe by radially-outward movement of that member from the clamp. The back-up member preferably has a temperature management system comprising heating and cooling systems that are responsive to sensed temperature of the pipe.

The first and second FSW tools may be two of a group of three or more such tools.

The inventive concept extends to: a welding station operating in accordance with the method of the invention or comprising the apparatus of the invention, and to a pipelay vessel or a shore fabrication facility comprising at least one welding station of the invention.

In summary, the invention provides an apparatus for performing FSW of thick pipeline. The apparatus comprises at least two distinct and successive FSW tools or heads, preferably mounted on the same mobile carriage which is able to rotate around the pipe lengths being joined. Each head is shaped and oriented to penetrate deeper in metal than any preceding head. A succeeding head is at such a distance from a preceding head that the succeeding head arrives in the plasticised region of metal in the HAZ left by the preceding head while the metal in that region remains in a plastic state, without undergoing a change in its metallurgical phase or solidifying.

The corresponding method of the invention comprises: positioning the two pipe lengths to be welded; aligning the pipe lengths, most suitably by an internal line-up clamp; moving a welding carriage around the pipe lengths, the welding carriage comprising at least two FSW heads; and turning the heads simultaneously to perform FSW between the pipe lengths, wherein each head penetrates the metal deeper than any preceding head.

Each welding head is pulled away from the pipe once the corresponding pass is finished. Any hole left by the last welding head may be filled with a sacrificial filling metal.

The carriage may be carried by a ring mounted on the pipe and/or by an external arm.

A local induction and/or resistance heater system may be mounted on the carriage in front of the welding heads. Metal may be heated locally, for example by induction, before contacting it with the first head; local heating may continue after contact with the first head such that every head benefits from pre-heating the metal.

The apparatus may also comprise an internal backing clamp that is adapted to allow fine temperature adjustment of the inner side of the weld. Such a backing clamp may comprise at least one backing pad or segment designed to compensate the mechanical loads generated by FSW, which backing clamp optionally includes a temperature-management system that may comprise a temperature sensor, a heating system and a cooling system.

Where a backing clamp is inserted inside the pipe lengths, an internal line-up clamp that aligns the pipes suitably also supports the backing clamp.

In order that the invention may be more readily understood, reference will now be made, by way of example, to the accompanying drawings in which.

Figure 1:
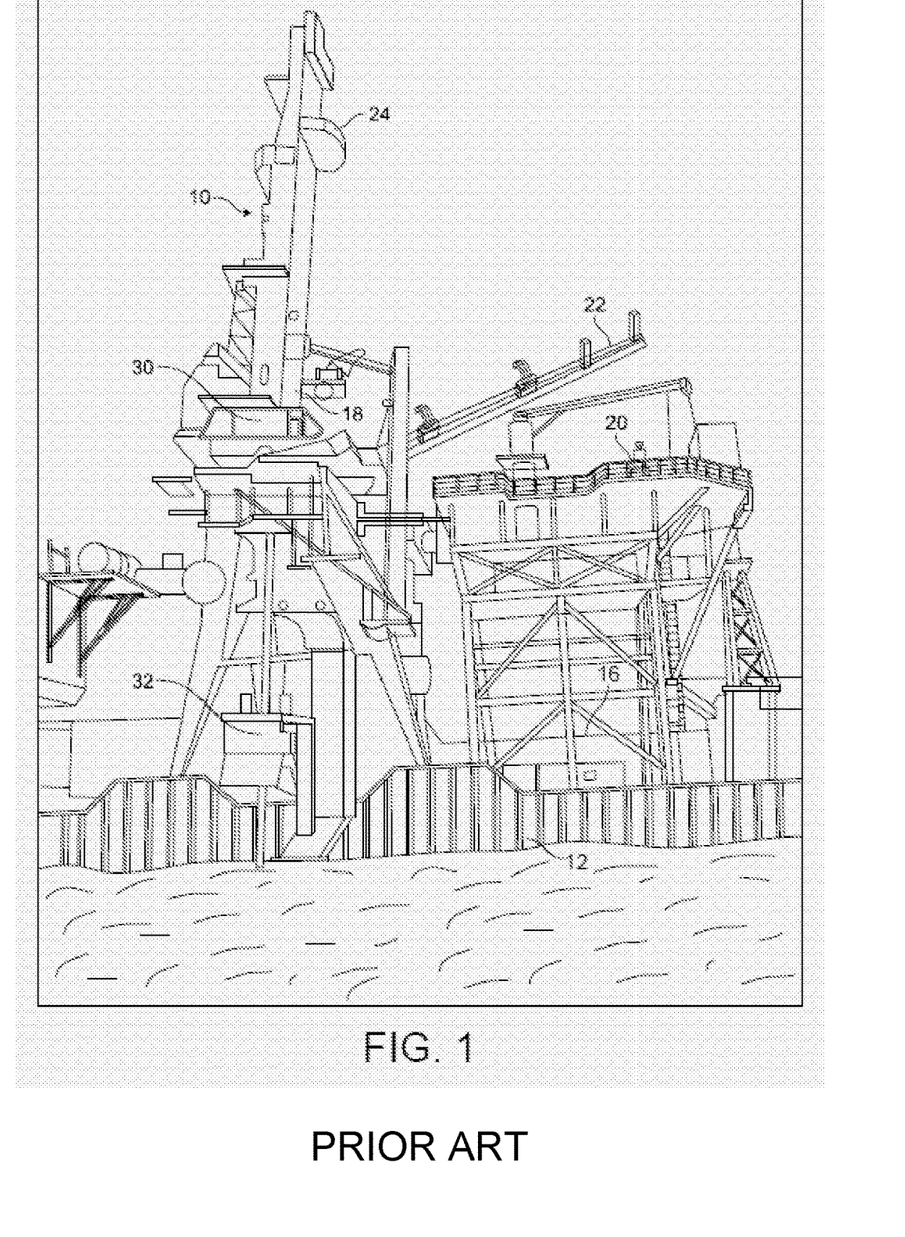
FIG. 1 is a perspective view from near sea level of a J-Lay tower on a barge, to illustrate the prior art background.

An example of a J-lay system is found on the Applicant's pipe lay vessel Seven Borealis. To put the invention into its context of use, the operation of Seven Borealis during J-lay pipelaying will firstly be described with reference to FIGS. 1 to 3 of the drawings. This J-lay example does not limit the scope of the invention, whose wider applicability has already been explained.

The J-lay tower 10 of the barge 12 is supplied with pipe joints 14 fabricated onshore, which are stored horizontally on the deck 16. In this example, the pipe joints 14 are double joints although triple- or quad-joints could be used if a J-lay tower 10 is tall enough.

Figure 2:
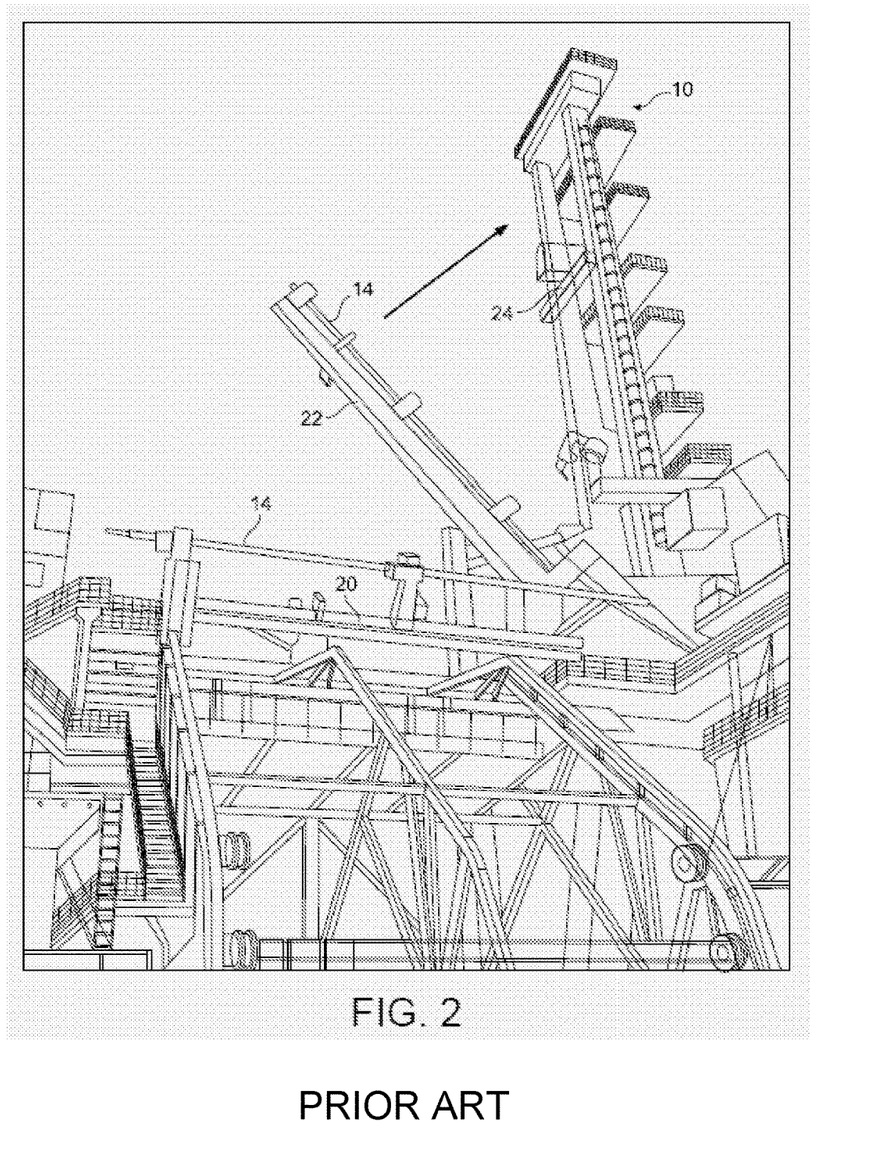
FIG. 2 is a perspective view of an erector arm loading a double joint into the tower of FIG. 1.

As required, the pipe joints 14 are lifted successively in horizontal orientation from the deck 16 to a tower entry level 18 using a pipe elevator system 20 best shown in FIG. 2. Here, a pipe joint 14 is loaded into a pivoting erector arm 22 which upends the pipe joint 14 into an upright orientation and passes it over to a tower handling system comprising a tensioner 24. The pipe joint 14 is then lowered down and aligned with the pipeline end 26 held in a support bushing 28 (see FIG. 3) at a first work station 30 on the tower 10.

The pipe joint 14 is welded to the pipeline end 26 at the first work station 30 before the load of the pipe string is transferred to the tensioner 24 near the top of the J-lay tower 10. The completed pipe string is then lowered down to the support bushing 28 for the addition of the next pipe joint 14. The tensioner 24 and the support bushing 28 alternate to grip the pipeline end, interacting in a so-called 'hand-over-hand' manner.

As the pipe string is lowered, a field joint coating is applied to the welded joint at a second work station 32 suspended from the tower 10 below the first work station 30. The weld can be inspected at either or both of these two work stations 30, 32.

Figure 3:
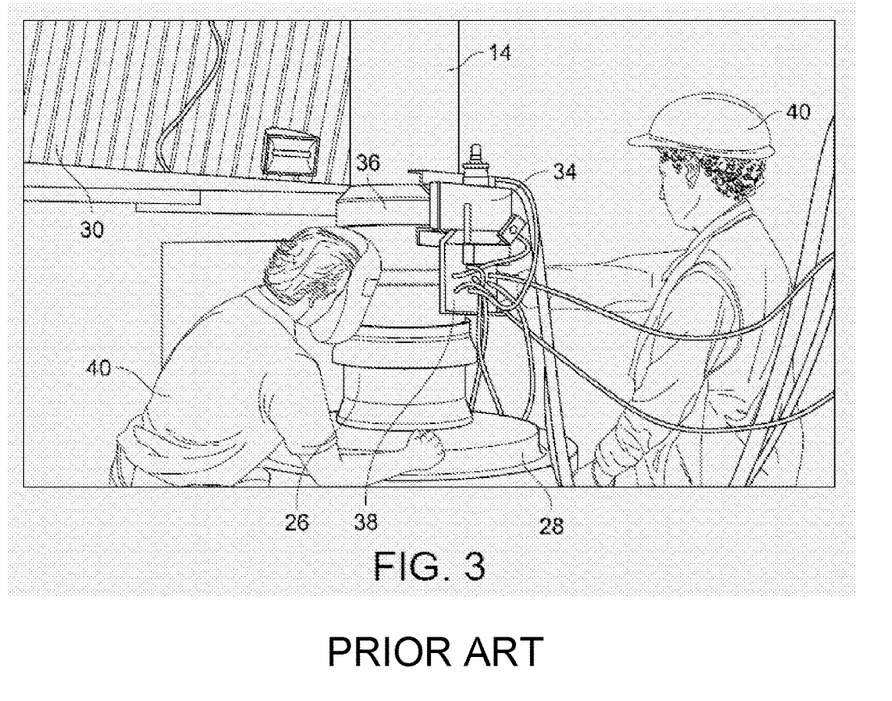
FIG. 3 is a perspective view of a welding operation taking place at a welding station in the tower of FIG. 1.

As shown in FIG. 3, welding is performed by one or more automatic welding bugs 34 that are driven around the pipe string on a track or guide band 36 fixed on the pipe joint 14 being welded to the pipeline end 26 below. The or each bug 34 moves circumferentially around the pipe string so that one or more welding heads 38 carried by the bug 34 can run a weld bead within a groove defined between the pipe joint 14 and the pipeline end 26.

Each welding bug 34 requires services including power, data connections, shielding gas and welding wire to be fed continuously to the welding heads 38 during welding. Platforms such as annular turntables at each work station 30, 32 enable pipeline workers 40 such as welders and supervisors to weld, inspect and coat the pipe string in the J-lay tower 10. The turntables provides working platforms for the pipeline workers 40 who control and observe the welding operation and may also support equipment required for the welding operation and for related processes such as weld inspection.

Figure 4:
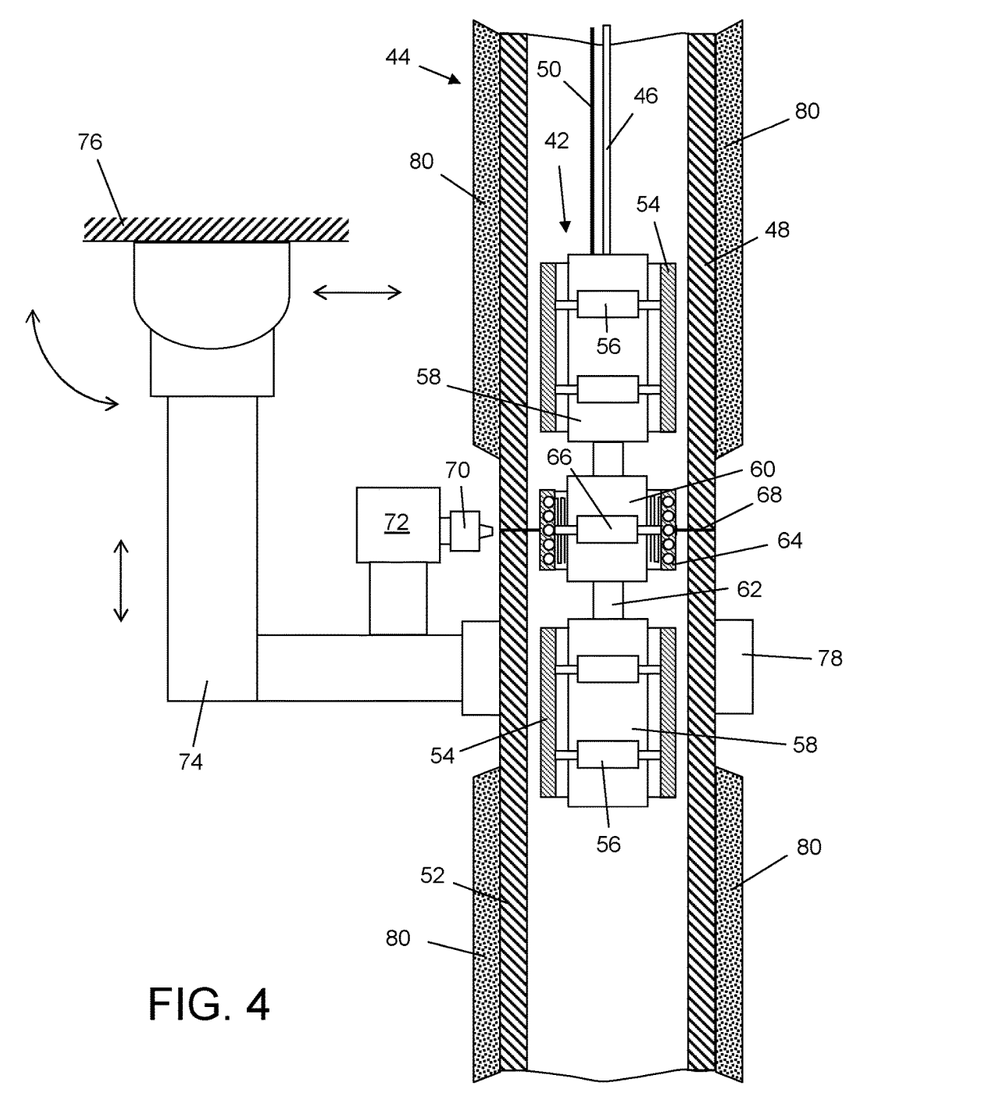
FIG. 4 is a schematic sectional side view of an internal line-up clamp lowered into an upright pipe during a J-lay operation, the clamp supporting an internal back-up ring shown here in a retracted position inside the pipe in alignment with a butt joint between adjoining lengths of the pipe, this view also showing an external FSW machine in accordance with the invention that is in a deployed position and is clamped to the pipe in readiness for welding.
Figure 5:
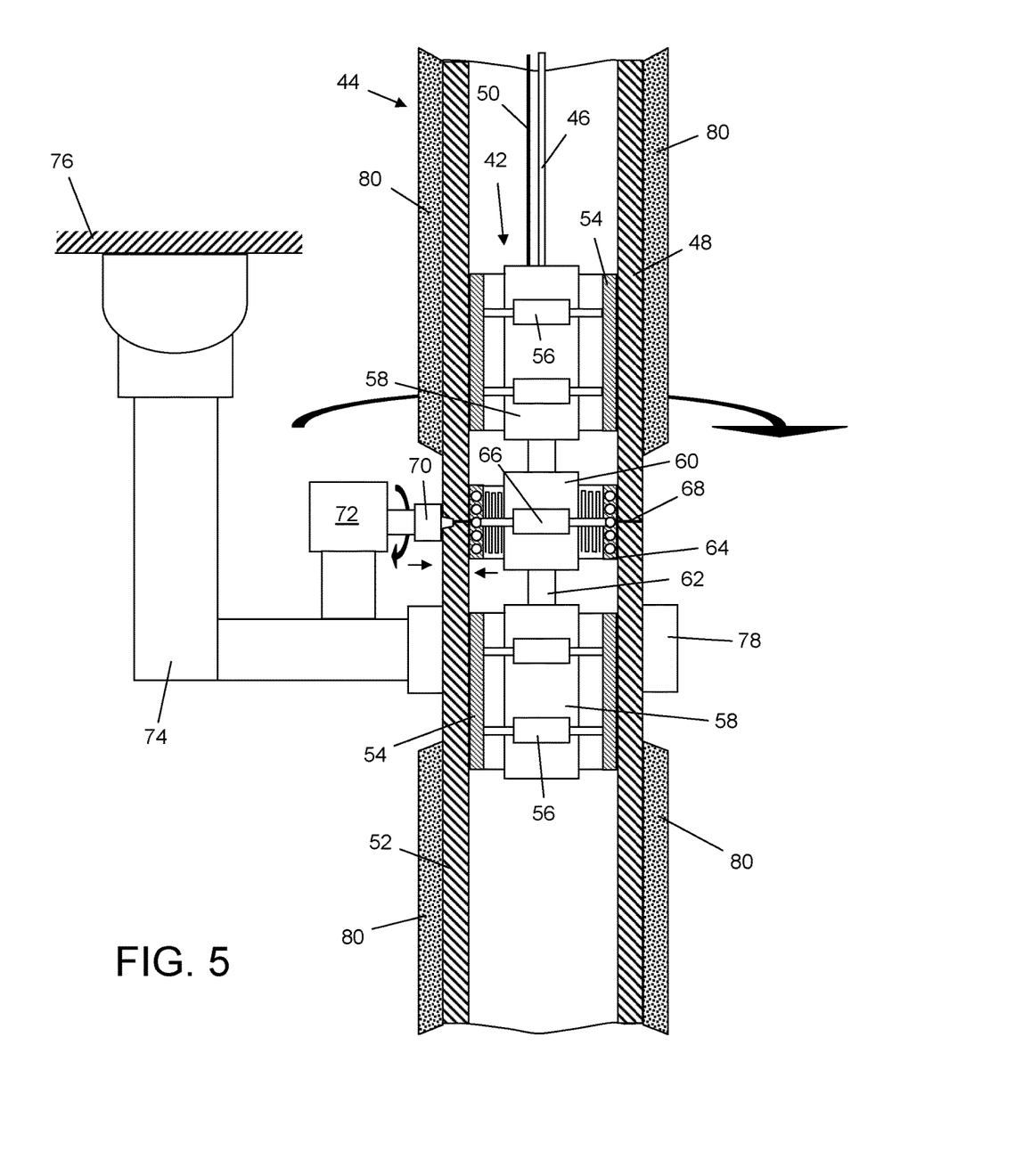
FIG. 5 corresponds to FIG. 4 and shows the pipe clamp and the internal back-up ring engaged with the inside of the pipe and the FSW machine performing a weld along the butt joint while moving around the outside of the pipe.

With reference now to FIGS. 4 and 5 to introduce the invention, an internal line-up clamp or ILUC 42 is fitted inside a pipe 44 shown here held upright as in a J-lay tower. However the J-lay tower and associated equipment such as the aforementioned support bushing have been omitted from this schematic view for clarity.

The ILUC 42 is suspended on a winch cable 46 that extends down from the open end of the upper pipe length 48. An umbilical 50 also extends down to the ILUC 42 from the open end of the upper pipe length 48 to provide hydraulic, pneumatic and/or electrical power to the ILUC 42, and if necessary to supply heating and cooling fluids as will be explained.

The main function of the ILUC 42 is to maintain alignment between, and to locate, the adjoining ends of upper and lower pipe lengths 48, 52 during a butt-welding operation. To do so, the ILUC 42 has pneumatically- or hydraulically-operated clamping devices exemplified here by shoes 54 driven radially by actuators 56. The shoes 54 are distributed angularly about a central longitudinal axis of the ILUC 42 and act radially outwardly to bear against the internal surfaces of the adjoining pipe lengths 48, 52.

Initially the shoes 54 are retracted for insertion of the ILUC 42 into the pipe 44 as shown in FIG. 4. Final alignment and adjustment is made before the ILUC locks both pipe lengths against relative movement. Locking is achieved by deploying the shoes 54 radially outwardly to lock the ILUC 42 relative to the pipe 44 as shown in FIG. 5.

The ILUC 42 shown in FIGS. 4 and 5 comprises three sections, namely: two longitudinally-spaced clamping mechanisms 58 that include the shoes 54 and actuators 56; and an internal back-up mechanism 60 that is positioned longitudinally centrally between the clamping mechanisms 58. The back-up mechanism 60 is supported in this example by a central spine member 62 that rigidly joins the clamping mechanisms 58.

The back-up mechanism 60 comprises back-up ring segments 64 driven radially by actuators 66. Initially the ring segments 64, like the shoes 54 of the clamping mechanisms 58, are retracted radially inwardly for insertion of the ILUC 42 into the pipe 44 as shown in FIG. 4. When the shoes 54 have been deployed radially outwardly to lock the ILUC 42 relative to the pipe 44, the ring segments 64 are also deployed radially outwardly as shown in FIG. 5 to apply back-up force against the inner wall of the pipe 44 in alignment with the circumferential interface 68 between the pipe lengths 48, 52.

In use, the ILUC 42 is lowered through the interior of the upper pipe length 48 until it bridges the abutting ends of the pipe lengths 48, 52 and the back-up mechanism 60 is aligned with the interface 68. At that interface 68, the pipe lengths 48, 52 butt against each other end-to-end with little or no gap. Nor is there a need for a bevel defining an external groove. This is unlike the arc welding arrangements of the prior art, which are much prolonged by the fill passes required to fill the groove after a root pass has been performed at the base of the groove. However, a narrow bevel is possible if that happens to assist a particular FSW operation.

The back-up force applied via the ring segments 64 resists high z-axis loads applied through rotary welding tools 70 that face radially inwardly from an external FSW machine 72, so as to prevent inward radial deformation or deflection of the pipe 44 during an FSW operation. Only one tool 70 is visible in the views of FIGS. 4 and 5 but it will be apparent with reference to FIGS. 6 and 7 that the welding machine 92 supports two or more, preferably three, welding heads that are designated as 70A, 70B and 70C in those latter drawings. The tools 70 can be retracted or advanced with respect to the FSW machine 72 along respective radial axes with respect to the pipe 44 and are driven by respective motors in the FSW machine 72 to spin at high speed about those radial axes.

The external FSW machine 72 is supported beside the pipe 44 by a pivot arm 74 that is pivotally attached to a foundation structure 76. That foundation structure 76 may, for example, be a part of the J-lay tower; it may also be a turntable mounted to the tower to turn around the pipe 44. As noted above, it is well known in J-lay operations for a turntable not only to provide a working platform for welding operatives but also to support equipment that is required for a welding operation.

The pivot arm 74 also supports a clamp ring 78 that encircles the pipe 44. The clamp ring 78 suitably comprises hinged jaws that can be opened and closed around the pipe 44. Once the clamp ring 78 is closed around the pipe 44 in this way, the rotary welding tools 70 of the FSW machine 72 can be advanced into engagement with the exterior of the pipe 44 in line with the interface 68 between the pipe lengths 48, 52 so that the external FSW operation can begin.

The clamp ring 78 and the pivot arm 74 cooperate to locate the FSW machine 72 against reaction forces during the FSW operation. One of those reaction forces arises as the FSW machine 72 turns about the pipe 44 to traverse the rotary welding tools 70 along the interface 68. Another reaction force is a torque reaction that arises as the rotary welding tools 70 turn relative to the pipe 44. For resisting these forces, the clamp ring 78 and the pivot arm 74 supplement each other's strength and so those individual components may be made less bulky, which is an advantage where space is limited beside the pipe 44.

In some arrangements, the clamp ring 78 may grip the pipe 44 tightly to serve as a track along which the FSW machine 72 can be driven around the pipe 44 to traverse the rotary welding tools 70 along the interface 68. In other arrangements, the clamp ring 78 may slide around the pipe 44 to enable the FSW machine 72 to be driven around the pipe 44 by another drive means, such as the aforementioned turntable.

It will be apparent in FIGS. 4 and 5 that the pipe lengths 48, 52 are coated with an insulating and protective coating 80. The coating 80 is cut back away from the interface 68 to give access to the bare metal of the pipe 44 for the welding operation. Cutting back the coating 80 asymmetrically about the interface—specifically, further back on the pipe length 52 than on the pipe length 48—also allows the clamp ring 78 to be applied directly to an uncoated outer surface of the pipe 44. Securing a single clamp ring 78 to one side of the interface 68 minimises the length of the cut-away region and hence reduces the length of a field joint coating that will be necessary to fill that void after welding. Alternatively the clamp ring 98 may be applied to the coating 80 of the pipe length 48 via pads or jacks.

The arrangement described provides for accurate and safe positioning of welding equipment within the limited space of an offshore welding station and reduces the bare pipe end length that is required for clamping that equipment to the pipe 44. There is no need for an electrical earth connection on the pipe 44.

Although not shown in FIGS. 4 and 5, the pivot arm 74 can swing the FSW machine 72 and the clamp ring 78 between the deployed position shown in FIGS. 4 and 5 and a retracted or stowed position away from the deployment axis of the pipe 44.

Figure 6:
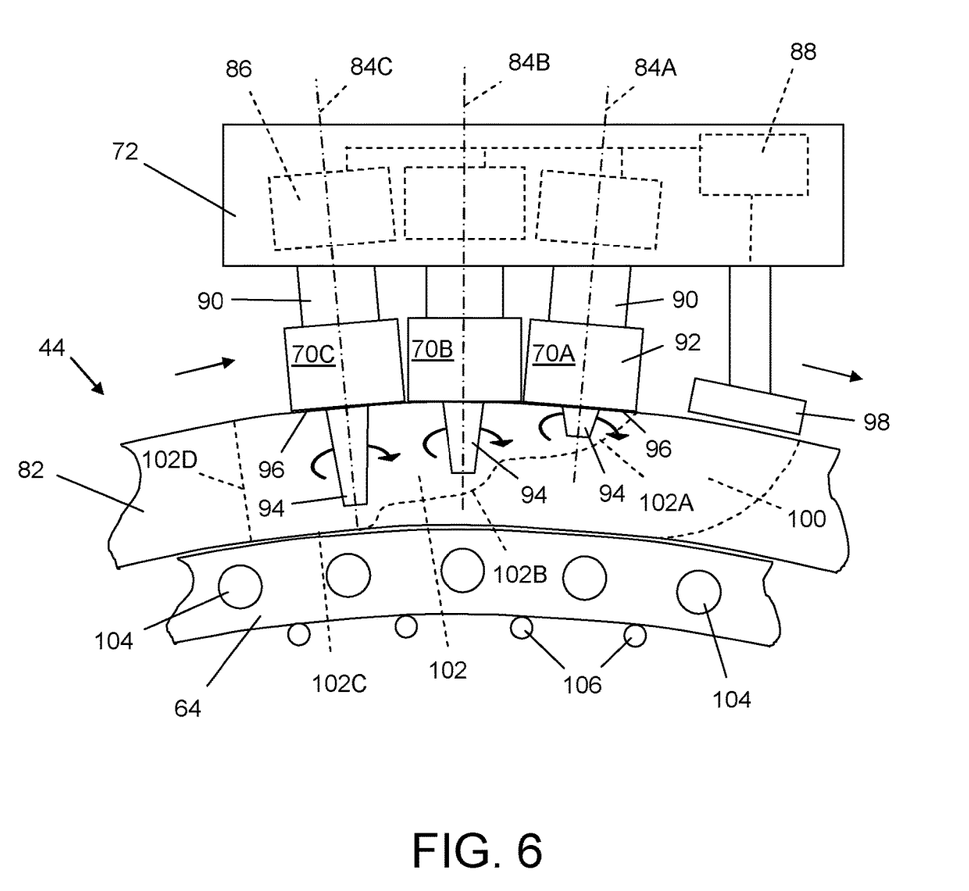
FIG. 6 is a schematic enlarged partial cross-sectional view of a wall of the pipe being pre-heated and then welded by the FSW machine of FIGS. 4 and 5.

Turning now to FIG. 6, this shows how the rotary welding tools 70A, 70B and 70C relate to each other as a group, to the FSW machine 72 that controls and drives them, and to a wall 82 of the pipe 44 on which the tools 70A, 70B and 70C perform FSW. Part of an internal back-up ring segment 64 is also shown, pressing radially outwardly against the inside of the wall 82.

It is apparent from the top view of FIG. 6 that the tools 70A, 70B and 70C are arranged in series in a row in circumferential succession with respect to the pipe 44. The tools 70A, 70B, 70C spin about their respective central longitudinal axes 84A, 84B, 84C during an FSW operation. The central longitudinal axes 84A, 84B, 84C are radial with respect to the pipe 44 and hence splay radially outwardly such that each of those axes 84A, 84B, 84C is orthogonal with respect to the wall 82 of the pipe 44.

Each tool 70A, 70B, 70C is driven by a respective individual motor 86 in the FSW machine 72. The motors 86 are connected to a controller 88 for central coordinated control of the system. The controller 88 controls the motors 86 themselves and also, in a wider sense, controls relative movement between the FSW machine 72 and the pipe 44.

The controller 88 may take various inputs in known fashion, such as a workpiece temperature signal from a thermocouple or a tool stress signal from a strain sensor. The controller 88 may generate various control outputs in response to those inputs and also in response to operator commands.

Some control outputs of the controller 88 may be synchronised between the tools 70A, 70B, 70C, such as a command to advance the tools 70A, 70B, 70C into contact with the pipe 44 ready for an FSW operation to begin, or to disengage the tools 70A, 70B, 70C from the pipe 44 and to stop rotating when an FSW operation has ended. Other control outputs of the controller 88 should, however, be specific to the different tools 70A, 70B, 70C. For example, each tool 70A, 70B, 70C requires individual monitoring and control adjustments for parameters such as tool rotation speed, tool traverse speed and z-axis load.

During an FSW operation, as explained above, there is relative circumferential movement between the FSW machine 72 and the wall 82 of the pipe 44. Most commonly, that relative movement is effected by orbital motion of the FSW machine 72 around the stationary pipe 44, where the FSW machine serves as a carriage for the tools 70A, 70B, 70C. That circumferential movement is indicated by the circumferential arrows in FIG. 6. With respect to that movement, the tool 70A at one end of the row is a leading tool and the tool 70C at the other end of the row is a trailing tool.

In the row of three tools as illustrated, the intermediate tool 70B is a central tool. However, some variants may omit an intermediate tool, leaving a row of just two tools; other variants may have more than one intermediate tool between the leading and trailing tool, creating a row of four or more tools.

Each of the tools 70A, 70B, 70C is rotationally symmetrical about its respective central longitudinal axis 84A, 84B, 84C. Each tool 70A, 70B, 70C comprises a shank 90, a probe holder 92 at a distal end of the shank 90 and a probe 94 protruding distally from the probe holder 92. The probe holder 92 defines a shoulder 96 around the probe 94 to exert inward forging pressure on the softened metal during an FSW operation. Thus, the shoulders 96 of the tools 70A, 70B, 70C. are oriented and positioned on the outer circumference of the pipe 44 so as to bear against the outside of the wall 82.

The tools 70A, 70B, 70C rotate in the same sense in FIG. 6 but adjacent pairs of the tools 70A, 70B and 70B, 70C could possibly contra-rotate in other embodiments of the invention. In other words, the intermediate tool 70B of the row could turn in an opposite sense to the leading and trailing tools 70A and 70C of the row.

Each probe 94 has a frusto-conical shape that tapers distally in a radially-inward direction with respect to the pipe 44. The lengths of the probes 94 measured from the shoulder 96 to the probe tip increase from a short probe 94 on the leading tool 70A to a medium-length probe 94 on the intermediate tool 70B and to a long probe 94 on the trailing tool 70C. By way of example, the length of the short probe 94 could be about 20 mm, the length of the medium-length probe 94 could be about 40 mm and the length of the long probe 94 could be about 60 mm. The thickness of the wall 82 could be a little greater than the length of the longest probe 94, for example about 70 mm.

For ease of illustration, the tools 70A, 70B and 70C are identical other than in the lengths of their probes 94 and their orientations. However, other features of the tools 70A, 70B and 70C could also vary to suit their different roles, such as the width or profile of the shoulder 96, or the width, taper angle or surface texture of the probe 94.

Another feature shown schematically in FIG. 6 is an optional pre-heat system 98 that is supported ahead of the group of tools 70A, 70B and 70C. The pre-heat system 98 will be discussed in more detail below with reference to FIG. 7. Its purpose is to pre-heat the pipe wall 82 so that the leading tool 70A encounters already-heated metal.

Figure 7:
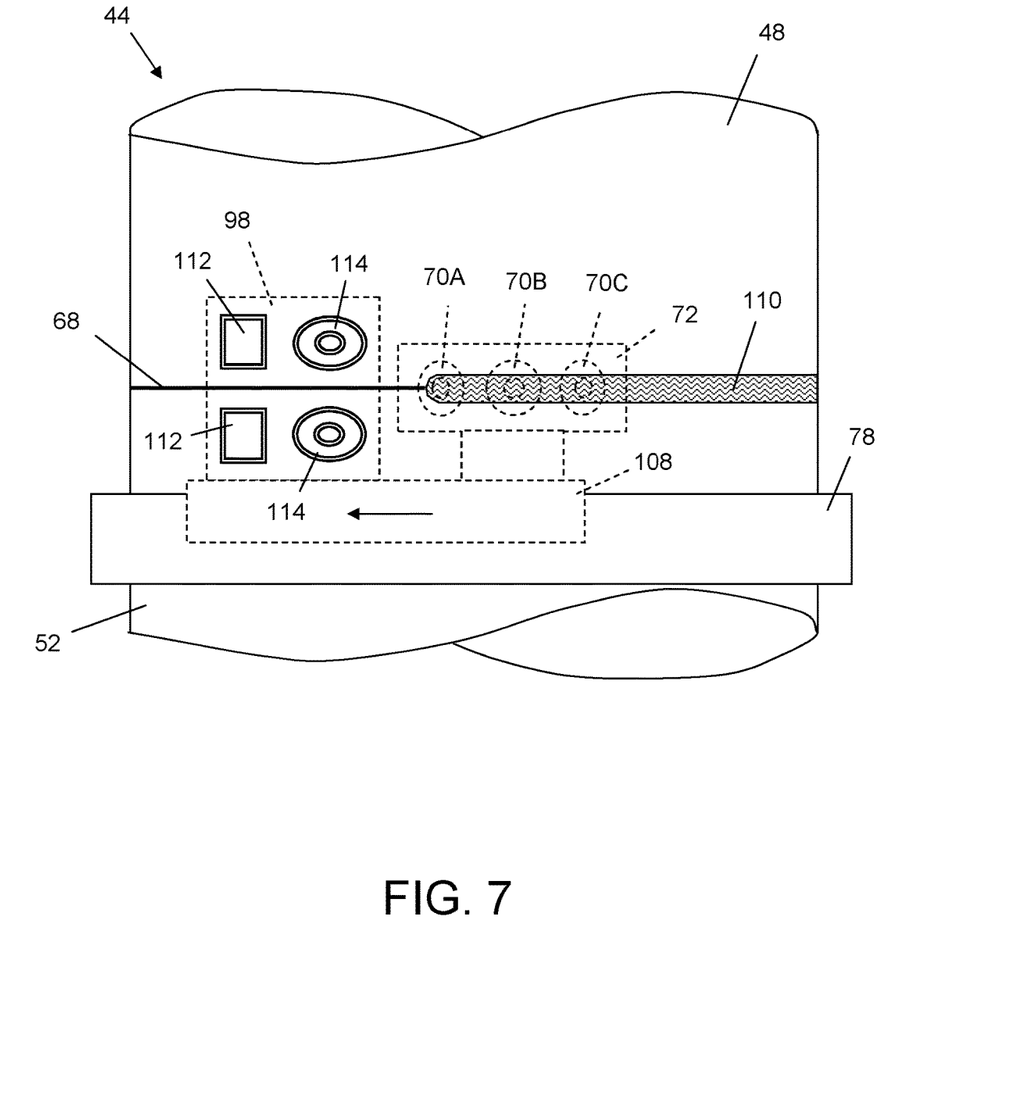
FIG. 7 is a schematic side view of the pipe and the FSW machine of FIG. 6 producing a weld around the pipe, with further preheating equipment supported ahead of the FSW machine with respect to the welding direction.

The pre-heat system 98 is shown conveniently supported by a leading end of a housing of the FSW machine 72 in FIG. 6 but it could be supported in another way, such as on a carriage movable along the clamp ring 78 around the pipe 44 as shown in FIG. 7.

FIG. 6 shows the spinning probes 94 of the tools 70A, 70B and 70C plunged into the wall 82 of the pipe 44 and traversing the pipe 44 circumferentially during an FSW operation. The shoulders 96 of the probe holders 92 bear against the outside of the pipe 44 to limit insertion of the probes 94 and to apply forging pressure to the softened metal. Forging pressure may also be applied by forcing together the upper and lower pipe lengths 48, 52 at their interface 68, for example using a suitably-adapted ILUC to apply longitudinal traction to the pipe lengths 48, 52. In any event, using an ILUC to clamp the upper and lower pipe lengths 48, 52 against separation under thermal expansion will serve to maintain inward pressure on the softened interface, as will the self-weight of the upper pipe length 48 if it is allowed to rest on the lower pipe length 52.

In consequence of pre-heating and the stepped lengths of the probes 94 that increase in the trailing direction along the row, differently-heated zones are created within the wall 82. The approximate boundaries of those zones are shown schematically in FIG. 6 in dashed lines, although it will be understood that in reality the boundaries will be less distinct and that they may be shaped slightly differently.

Firstly, a pre-heated zone 100 is created ahead of the leading tool 70A by the action of the pre-heat system 98. This ensures that the leading tool 70A encounters metal that is already hot, although not yet softened. As a result, the leading tool 70A needs to input less heat energy generated by friction and stirring to achieve and to maintain the plasticised conditions that are necessary for the FSW operation.

To recap, each tool 70A, 70B and 70C creates a thermo-mechanically affected zone (TMAZ), which is a region that is affected metallurgically by both temperature cycling and plastic deformation, in particular stirring. It is here that the metal is softened and stirred. The TMAZ extends around the frusto-conical side walls of the probes 94 and also distally beyond the tips of the probes 94. Thus, the TMAZ is slightly wider than the width of each probe 94 and extends slightly deeper into the metal than the depth or length of each probe 94.

Assisted by optional pre-heating as described above, the leading tool 70A heats the metal to a plastic state for stirring. This initiates a softened zone 102 whose leading boundary section 102A extends a small distance ahead of the short probe 94 of the leading tool 70A. The leading boundary section 102A also extends slightly deeper than the short probe 94 of the leading tool 70A, but only part of the way through the thickness of the wall 82. Thus, the leading tool 70A whose probe is about 20 mm long effects a part-thickness weld to a depth of say 30 mm while remaining within an acceptable window of temperature and load.

After the leading tool 70A traverses to depart the region it has just stirred, the stirred metal remains soft before cooling will soon harden the metal again. In accordance with the invention, another tool with a longer probe (in this instance the intermediate tool 70B with the medium-length probe 94) immediately following the leading tool 70A enters the region already softened by the leading tool 70A while that metal is still soft. This means that the intermediate tool 70B only needs to soften metal that exceeds the depth of the leading boundary section 102A.

The result is a deepened intermediate boundary section 102B of the softened zone 102 that extends slightly deeper than the medium-length probe 94 of the intermediate tool 70B, but still only part of the way through the thickness of the wall 82. Thus, the intermediate tool 70B can extend the part-thickness weld to a depth of say 50 mm while remaining within an acceptable window of temperature and load.

Again, after the intermediate tool 70B traverses to depart the region it has just stirred, the trailing tool 70C with the long probe 94 enters the region already softened by the intermediate tool 70B while that metal is still soft. This means that the trailing tool 70C only needs to soften metal that exceeds the depth of the intermediate boundary section 102B. The result is to deepen the trailing boundary section 102C of the softened zone 102, which extends slightly deeper than the long probe 94 of the trailing tool 70C, now to extend through the full thickness of the wall 82. Thus, the trailing tool 70C extends the depth of the weld to the full thickness of the wall 82, say 70 mm, while remaining within an acceptable window of temperature and load.

As soon as the trailing tool 70C traverses away from the region it has just stirred, the metal begins to cool and harden. In consequence, the softened zone 102 terminates at a trailing boundary section 102D that extends approximately radially through the wall 82 some distance after the trailing tool 70C.

Welding continues until the trailing tool 70C completes a full circuit of the pipe 44 to complete a circumferential weld to full depth, whereupon the tools 70A, 70B, 70C are withdrawn from the wall 82 of the pipe. The tools 70A, 70B, 70C may be withdrawn from the wall 82 either simultaneously or preferably in succession from the leading end of the group so that the trailing tool 70C consolidates the weld.

The back-up ring segment 64 shown in FIG. 6 has features to aid cooling and heating, so as to control the temperature of the segments 64 and also the temperature of the pipe wall 82 in contact with the segments 64. Those features are cooling pipes 104 for carrying cooling fluid through the segment 64 to carry heat away when required and electrical heating elements 106 in heat-conducting contact with the segment 64 to add heat if required instead.

The cooling and heating features 104, 106 of the back-up ring segments 64 may be controlled, for example by the controller 88, individually or in groups to apply heating or cooling locally in accordance with the progress of the FSW machine 72 during circumferential traverse movement. For example, heating may be applied through selected elements 106 ahead of the leading tool 70A in support of the pre-heat system 98. Conversely, cooling may be applied locally through selected pipes 104 to protect the segments 64 where the softened zone 98 deepens to the trailing boundary section 102D, and to cool the softened metal quickly after the trailing tool 70C has passed by.

To aid overall control of the FSW operation, the cooling and heating features of the back-up ring segments 64 may also be controlled, for example by the controller 88, in response to temperature measurements from the pre-heat zone 100 or the softened zone 102.

Finally, FIG. 7 shows a pre-heating system 98 and a FSW machine 72 mounted separately on a carriage 108 that runs along a clamp ring 78 fixed around the pipe 44. The FSW machine 72 carries three welding tools 70A, 70B and 70C, which are shown here in the process of making a weld 110 along the interface 68 between the pipe lengths 48, 52. The pre-heating system 98 is disposed ahead of the tools 70A, 70B and 70C in the welding direction and in this instance comprises a mix of induction preheaters 112 and high-frequency resistance preheaters 114 disposed in pairs, one each side of the interface 68.

Variations are possible within the inventive concept. For example, in welding arrangements that involve a turning pipe rather than a fixed pipe—notably the horizontal '1G' position that may be used for S-lay and spoolbase operations—the welding equipment may be fixed because the pipe moves instead. In that case, rotation of the pipe determines traverse movement of the welding tools along a butt joint.

The heating and cooling systems implemented in the back-up clamp segments may comprise the same features, for example a heat exchanger that provides for circulation of cold fluid, such as cold water, or hot fluid, such as hot water or steam, depending upon whether cooling or heating is required.

In its broadest sense, the invention may be applied to workpieces that are not pipes and even to workpieces that are not curved, such as flat plates. The invention has particular advantages for the fabrication of pipe strings but can also be used to weld accessories to such pipe strings, and to fabricate any equipment such as vessels or tanks that will contain corrosive fluids. Also, the principles of the invention may be applied to friction stir processing as opposed to FSW. Friction stir processing may, for example, be employed to remove defects in a joint already made, whether by FSW, fusion welding or otherwise.

The invention claimed is:

1. A method of fabricating a metal pipeline by friction stir welding (FSW) along a circumferential interface between lengths of pipe disposed end-to-end or between a length of pipe and a pipeline accessory comprises:

spinning first and second FSW tools about respective axes of rotation in contact with a pipe wall to heat, plasticize and stir respective zones of plasticized metal at the interface, the zone of plasticized metal produced by the second FSW tool extending deeper into the pipe wall than the zone of plasticized metal produced by the first FSW tool; and effecting relative circumferential movement of the FSW tools along the interface such that the second FSW tool follows the first FSW tool in a traverse direction and enters the zone of plasticized metal produced by the first FSW tool while the metal in that zone remains plastic.

2. The method of claim 1, wherein:

the first and second FSW tools are outside the pipe and are forced radially inwardly along their axes of rotation against an external surface of the pipe; and an internal back-up member is positioned against an internal surface of the pipe in opposition to the inward forces applied by the first and second FSW tools.

3. The method of claim 2, wherein the internal back-up member is applied to the internal surface of the pipe by radially-outward movement of that member from an internal line-up clamp that is positioned to bridge the interface.

4. The method of claim 1, comprising adding heat to a leading portion of the pipe wall before, during or after heating, plasticizing and stirring that portion of the pipe wall with the first FSW tool.

5. The method of claim 4, wherein the leading portion of the pipe wall is heated by locally heating at least part of an internal back-up member within the pipe.

6. The method of claim 4, wherein the leading portion of the pipe wall is heated by induction heating or by electrical resistance heating.

7. The method of claim 6, comprising advancing an induction heating system or an electrical resistance heating system with the FSW tools around the interface.

8. The method of claim 1, comprising cooling a trailing portion of the pipe wall after that portion of the pipe wall has been heated, plasticized, and stirred by the second or any following FSW tool.

9. The method of claim 8, wherein the trailing portion of the pipe wall is cooled by locally cooling at least part of an internal back-up member within the pipe.

10. The method of claim 1, wherein: the first and second FSW tools are two of a group of three or more such tools, each of the tools in that group spinning about respective axes of rotation; and the zone of plasticized metal produced by a trailing tool of an adjacent pair of tools in the group extending deeper into the pipe wall than the zone of plasticized metal produced by a leading tool of that pair, with respect to the direction of relative circumferential movement of the tools along the interface.

11. An apparatus for fabricating a metal pipeline by friction stir welding (FSW) along a circumferential weld interface, wherein:

the apparatus comprises a carriage that is arranged for movement parallel to the weld interface and that supports first and second FSW tools both to follow the weld interface upon movement of the carriage;

the apparatus comprises a controller configured to drive the FSW tools to spin about respective circumferentially-spaced axes of rotation so as to heat, plasticize, and stir respective zones of plasticized metal when probes of those FSW tools are in contact with a pipe wall at the weld interface and configured to move the carriage along the weld interface such that the second FSW tool trails the first FSW tool along the interface as the FSW tools are driven to spin about their respective axes of rotation; and the first FSW tool has a shorter probe length to produce a relatively shallow zone of plasticized metal and the second FSW tool has a longer probe length to produce a relatively deep zone of plasticized metal that extends deeper into the pipe wall than the zone of plasticized metal produced by the first FSW tool.

12. The apparatus of claim 11, wherein the controller is configured to control movement of the carriage along the weld interface such that the second FSW tool following the first FSW tool enters the zone of plasticized metal produced by the first FSW tool while the metal in that zone remains plastic.

13. The apparatus of claim 11, wherein the axes of rotation of the first and second FSW tools extend radially from an axis corresponding, in use, to a central longitudinal axis of the pipe.

14. The apparatus of claim 13, wherein the first and second FSW tools have shoulders around their probes, the shoulders being at substantially a common radial distance from the axis that corresponds, in use, to the central longitudinal axis of the pipe.

15. The apparatus of claim 11, wherein the carriage is mounted movably to the pipe.

16. The apparatus of claim 11, wherein the carriage is mounted to an external support attached to a foundation.

17. The apparatus of claim 11, further comprising an induction pre-heating system or an electrical resistance pre-heating system mounted on the carriage or otherwise movable with the carriage along the weld interface.

18. The apparatus of claim 11, further comprising an internal line-up clamp that can be positioned to bridge the interface, the clamp carrying an internal back-up member that is capable of being applied to the internal surface of the pipe by radially-outward movement of that member from the clamp.

19. The apparatus of claim 18, wherein the internal back-up member has a temperature management system comprising heating and cooling systems that are responsive to sensed temperature of the pipe.

20. The apparatus of claim 11, wherein the first and second FSW tools are two of a group of three or more such tools.

21. A welding station configured to operate in accordance with the method of claim 1 or comprising an apparatus for fabricating a metal pipeline by friction stir welding (FSW) along a circumferential weld interface, wherein:

the apparatus comprises a carriage that is arranged for movement parallel to the weld interface and that supports first and second FSW tools both to follow the weld interface upon movement of the carriage;

the apparatus comprises a controller configured to drive the FSW tools to spin about respective circumferentially-spaced axes of rotation so as to heat, plasticize and stir respective zones of plasticized metal when probes of those FSW tools are in contact with a pipe wall at the weld interface and configured to move the carriage along the weld interface such that the second FSW tool trails the first FSW tool along the interface as the FSW tools are driven to spin about their respective axes of rotation; and the first FSW tool has a shorter probe length to produce a relatively shallow zone of plasticized metal and the second FSW tool has a longer probe length to produce a relatively deep zone of plasticized metal that extends deeper into the pipe wall than the zone of plasticized metal produced by the first FSW tool.

22. A pipelay vessel or a shore fabrication facility comprising at least one welding station of claim 21.

* * * * *